Sept. 11, 1951 H. W. NYLUND 2,567,824
AUTOMATIC GAIN CONTROL
Filed March 18, 1947
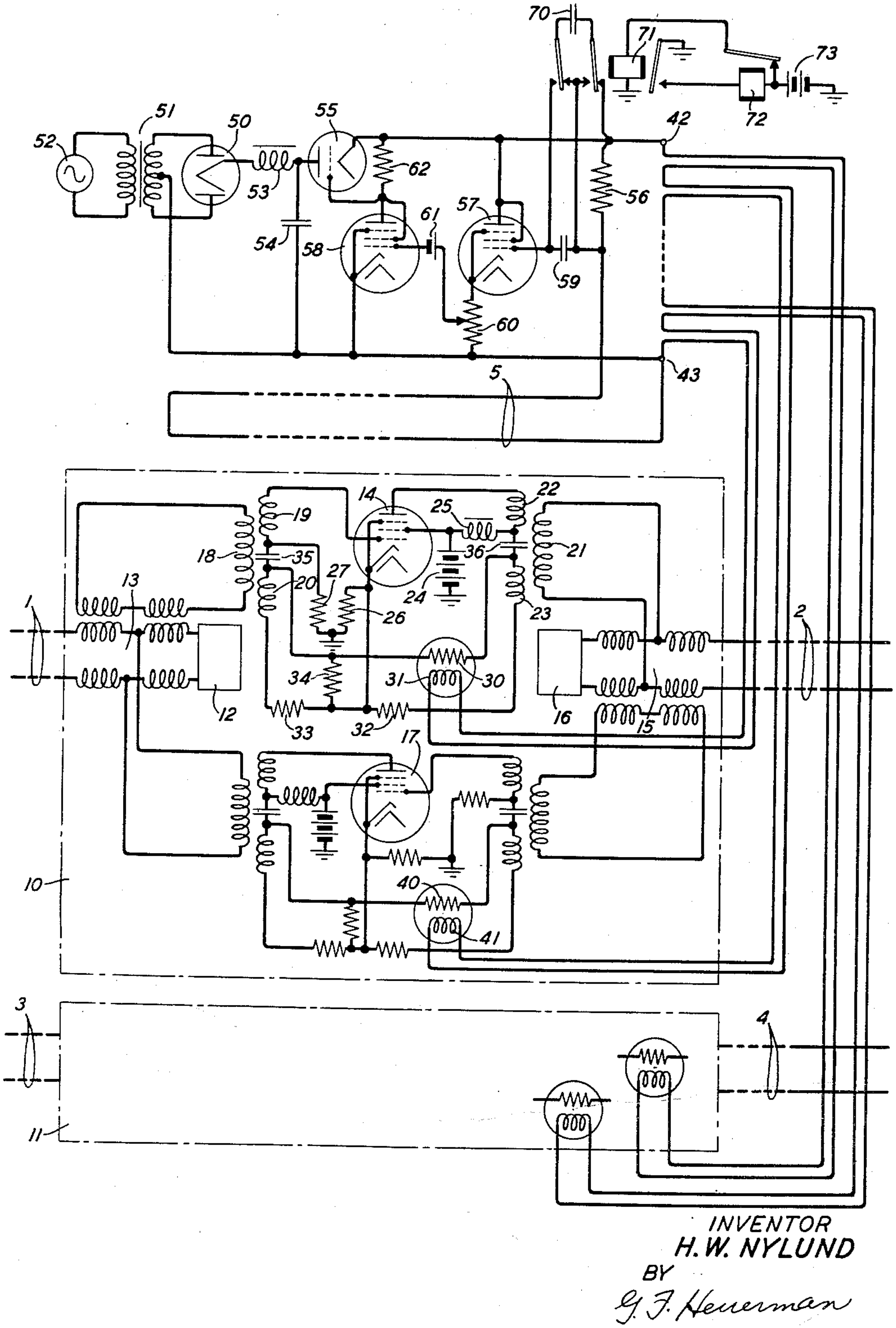
INVENTOR
H. W. NYLUND
BY
G. F. Heuerman
ATTORNEY Patented Sept. 11, 1951

2,567,824

UNITED STATES PATENT OFFICE 2,567,824

AUTOMATIC GAIN CONTROL

Harry W. Nylund, Great Neck, N. Y., assignor to Bell Telephone Laboratories, Incorporated, New York, N. Y., a corporation of New York Application March 18, 1947, Serial No. 735,522

9 Claims. (Cl. 178—44)

This invention relates to signal transmission systems and particularly, to the regulation of transmission of a system including, for example, a telephone line the transmission characteristic of which is subject to change with temperature variations.

An object of the invention is to provide improved apparatus for automatically controlling the gain of a repeater of a signal transmission system to maintain the signal transmission level of the system substantially constant irrespective of attenuation changes of the transmission line.

In a specific illustrative embodiment of the invention herein shown and described, there is provided a pilot wire gain control system for controlling the gain of each of a plurality of repeaters at a repeater station so as to minimize transmission changes of each of the transmission lines or channels with which the repeaters respectively are associated. The gain of each repeater amplifier is controlled in response to resistance changes of a temperature responsive resistive element or thermistor included in a feedback circuit of the amplifier, each thermistor having an electric heater for controlling the temperature of the resistance element with which it is associated. The thermistor heaters are connected in a load circuit to which is supplied direct current the amplitude of which is controlled to maintain the load voltage substantially constant during periods in which the resistance of the pilot wire is constant, thereby minimizing transmission level changes during such periods. Means are provided for causing the load voltage to change in response to change of resistance of the pilot wire to control the heating of the thermistors and thereby to control the gain of each repeater to maintain the transmission level of each signalling channel substantially constant irrespective of the change of attenuation of the lines associated with the repeaters, respectively. The voltage regulator comprises a series regulator space current tube having its space current path connected in series with the load and an amplifier for controlling the resistance of the space current path of the series regulator tube in response to the input voltage impressed upon the amplifier. The pilot wire and a resistor in series therewith are connected across the load so that as the resistance of the pilot wire increases, for example, the ratio of the voltage across the pilot wire to the voltage across the resistor will increase. There is set up for controlling the voltage regulator a control voltage substantially equal to the difference of the voltage across the pilot wire and the voltage across the series resistor, the circuit arrangement being such that the voltage across the thermistor heaters in series is decreased as the resistance of the pilot wire increases, and vice versa. Therefore, as the resistance of each of the telephone lines including the pilot wire is increased, the resistance of each thermistor decreases to cause an increase of transmission or gain of each repeater to compensate for the reduction of transmission or increased attenuation of each telephone line, thereby maintaining the transmission level of each signaling channel substantially fixed.

The invention will now be described in greater detail with reference to the accompanying drawing the single figure of which is a schematic view of a portion of a signal transmission system embodying the invention.

Referring to the drawing, there is shown a portion of a telephone or similar transmission system comprising at a repeater station a two-way repeater 10 for controlling the transmission level of signals transmitted over telephone line 1, 2 and a similar repeater 11 for controlling the transmission level of signals transmitted over another line 3, 4. The lines 1, 2 and 3, 4 may be pairs of conductors included with a large number of similar conductor pairs in a cable which also includes a pilot wire 5 formed of two conductors directly connected at their remote terminals. Repeaters such as repeater 10 may be provided at substantially equally spaced points along the transmission lines. Signalling current arriving over line 1 which terminates in a balancing network 12 is transferred by way of a hybrid coil 13, an amplifier comprising a space current device 14 and a hybrid coil 15 to the line 2 which is terminated in a balancing network 16. Similarly, signalling current arriving over line 2 is transferred by way of hybrid coil 15, an amplifier comprising space current device 17 and hybrid coil 13 to line 1. The amplifier comprising tube 17 is like the amplifier comprising tube 14 and it will therefore suffice to describe one only of these amplifiers. The amplifier including tube 14 comprises an input hybrid coil having windings 18, 19 and 20 and an output hybrid coil comprising windings 21, 22 and 23. Anode current is supplied to tube 14 from 130 volt battery 24, having its negative terminal grounded, through a circuit which may be traced from the positive battery terminal through an inductance element 25 and through winding 22 to the anode and from the cathode through 400-ohm resistor 26 to ground. Resistor 26 is in a circuit including 1-megohm resistor 27 and winding 19 connecting the control grid and cathode of tube 14 so that the grid is biased negatively with respect to the cathode by the voltage drop across resistor 26 produced by the anode current flowing therethrough. The positive terminal of battery 24 is directly connected to the screen grid of tube 14.

The amplifier including tube 14 is of the negative feedback type, there being provided a feedback path comprising winding 23 a thermistor 30 having a heater 31, series resistors 32 and 33, shunt resistor 34 and winding 20. Thermistors are described in an article by G. L. Pearson at page 106, et seq., of Bell Laboratories Record for December 1940. A circuit connecting the control grid and cathode of tube 14 comprises winding 19, 1-microfarad blocking condenser 35, winding 20 and resistor 33. A circuit connecting the anode and cathode of tube 14 comprises winding 22, 1-microfarad blocking condenser 36, winding 23 and resistor 32. The negative feedback increases as the resistance of thermistor 30 decreases and vice-versa. The thermistor 30 has a large negative temperature coefficient of resistance so that as the current supplied to the heater 31 is increased, for example, the resistance of thermistor 30 decreases to cause the transmission of the feedback path to increase, thereby causing the transmission or gain of the amplifier to decrease.

Each amplifier has a thermistor like thermistor 30 in its feedback path, the amplifier comprising tube 17, for example, having in its feedback path a thermistor 40 having a heater 41. A large number of thermistor heaters, 170 for example, are connected in series to the load terminals 42, 43 of a regulated rectifier which functions to maintain the load voltage substantially constant when the resistance of the pilot wire 5 is fixed and to change the load voltage in response to change of resistance of the pilot wire. While the thermistor heaters 31 and 41 are shown connected in series with other thermistor heaters to load terminals 42, 43, it may be preferable in some cases to connect the heater of thermistors such as 30, 31 associated with amplifiers transmitting in one direction in the load circuit of one regulated rectifier the load voltage of which is controlled by the resistance of the pilot wire 5 and to connect the heaters of thermistors such as 40, 41 associated with amplifiers transmitting in the opposite direction with another similar regulated rectifier the load voltage of which is controlled by the resistance of another pilot wire.

The rectifier for supplying current to the thermistor heaters connected in series to the load terminals 42, 43 comprises a full-wave rectifier tube 50 having anodes connected to the end terminals, respectively, of the secondary winding of a transformer 51 to the primary winding of which current is supplied from an alternating current source 52. A filter comprising a series inductance element 53 and a shunt condenser 54 is provided for suppressing ripples of the rectifier current. A mid-tap of secondary winding of transformer 51 is connected to the negative load terminal 43 and the cathode of rectifier tube 50 is connected through inductance element 53 and the anode-cathode path of a series regulator tube 55 to the positive load terminal 42. Across the load terminals there are connected in series a resistor 56 of 2840 ohms and the pilot wire 5, one terminal of the pilot wire being connected to the negative load terminal. There is provided a two-stage amplifier comprising space current tubes 57 and 58, the control grid of tube 57 being connected to a plate of a 1-microfarad condenser 59 the other plate of which is connected to the common terminal of pilot wire 5 and resistor 56. The anode and screen grid of tube 57 are directly connected to the positive load terminal and its cathode is connected through the resistance of a potentiometer 60 to the negative load terminal. The adjustable tap of potentiometer 60 is connected through a biasing battery 61 to the control grid of tube 58. The cathode of tube 58 is directly connected to the negative load terminal and its anode and screen grid are connected through a resistor 62 to the cathode of tube 55 and the positive load terminal. The anode of the tube 58 is connected to the control grid of series regulator tube 55.

There is provided for charging condenser 59 to a voltage substantially equal to the voltage drop across resistor 56 an arrangement comprising 1-microfarad condenser 70, relay 71 and slow-release relay 72. When relay 71 is energized by current from a battery 73 having its negative terminal grounded, condenser 70 is connected across resistor 56. Condenser 70 is thus charged if the voltage across resistor 56 is larger than the voltage across the condenser or discharged if the voltage across the condenser is larger than the voltage across the resistor. The armature of slow-release relay 72 is subsequently released to interrupt the energizing circuit for relay 71. As a result, condenser 70 is connected across condenser 59 and the charge on condenser 59 is increased or decreased to make the voltage across its terminals equal to the voltage across condenser 70. The voltage across condenser 59 is thus made substantially equal to the voltage across resistor 56. The release of the armatures of relay 71 also causes completion of a circuit for energizing relay 72, the operation of which completes an energizing circuit for relay 71. The condenser 70 is thus connected across resistor 56 during intermittent periods which are separated by intervals during which the condenser 70 is connected across condenser 59.

When the resistance of pilot wire 5 is constant, the voltage regulator functions to maintain the load voltage across the thermistor heaters substantially constant. The resistance of the pilot wire varies from 3620 ohms at a temperature of 40° below zero F. to 5310 ohms at a temperature of 140° above zero F. At any temperature within a normal operating range, therefore, the resistance of the pilot wire and the voltage drop across it are greater, respectively, than the resistance of resistor 56 and the voltage drop across resistor 56. Therefore, if the load voltage should rise slightly, for example, the control grids of tubes 57 and 58 will become relatively more positive or less negative with respect to the tube cathodes and the control grid of regulator tube 55 will become more negative with respect to its cathode. The anode-cathode resistance of the tube 55 is thus increased to cause the initially assumed increase of load voltage to be minimized.

When the resistance of pilot wire 5 increases due to a temperature increase, for example, the portion of the load voltage across the pilot wire increases and the portion of the load voltage across resistor 56 simultaneously decreases. The difference of these portions of the load voltage therefore increases as the pilot wire resistance increases to make the control grid of tube 57 relatively more positive with respect to its cathode. Therefore, the control grid of regulator tube 55 is made more negative with respect to its cathode with the result that the load current and the voltage across the load are reduced. The resulting reduction of current supplied to thermistor heater 31, for example, causes the thermistor resistance to increase. The negative feedback to the input of amplifier tube 14 is thus reduced and the gain of the amplifier is increased to compensate for the reduction of transmission due to the increased temperature of the line with which repeater 10 is associated.

In a test which was made the temperature of the pilot wire was set successively at minus 40° F., 0° F., plus 55° F., plus 100° F. and plus 140° F. The resistance values of the pilot wire corresponding to these temperatures were 3620 ohms, 3965 ohms, 4495 ohms, 4925 ohms and 5310 ohms, respectively; the values of current flowing through thermistor heaters were 4.61 milliamperes, 3.76 milliamperes, 2.99 milliamperes, 2.60 milliamperes and 2.36 milliamperes, respectively; the values of thermistor resistance were 1840 ohms, 3450 ohms, 6500 ohms, 9400 ohms and 11,600 ohms, respectively, and the values of transmission loss introduced into the feedback path by the addition of the thermistor therein were 1.74 decibels, 3.01 decibels, 5.02 decibels, 6.58 decibels and 7.59 decibels, respectively. Ideally, the values of transmission loss which should be introduced by the addition of the thermistor in the feedback circuit are 1.65 decibels, 3.05 decibels, 5.00 decibels, 6.59 decibels and 8.00 decibels, respectively. It will be noted that the results obtained differ from the ideal values of transmission loss introduced into the feedback path by negligibly small amounts over a temperature range from 0° F. to 100° F. The voltage supplied to the thermistor heaters connected in series in the load circuit of the regulated rectifier decreases from about 158 volts to about 82 volts as the resistance of the pilot wire increases from 3620 ohms to 5310 ohms, the rate of change of voltage with respect to pilot wire resistance decreasing as the pilot wire resistance increases.

What is claimed is:

1. Means for regulating the transmission level of a communication channel having a repeater connected therein comprising a thermistor associated with the repeater for varying its gain in response to resistance changes of said thermistor, an electric heater associated with said thermistor, a circuit for supplying current to said heater, a voltage regulating electric discharge device having an output circuit connected in said supply circuit for controlling its voltage in accordance with the resistance of said output circuit, a pilot conductor and a resistor in series therewith in a current path connected to said supply circuit, means comprising an amplifier electric discharge device responsive to voltage variations of said supply circuit for varying the resistance of said regulating device to maintain said supply voltage substantially constant when the resistance of said pilot conductor is constant, said amplifier device having an input circuit, and means for causing the resistance of the output circuit of said regulating device to vary in response to resistance variations of said pilot conductor, said means comprising a condenser in series with said pilot conductor connected in the input circuit of said amplifier device, and means for charging said condenser to a voltage substantially equal to the voltage drop across said resistor in a direction to oppose the voltage drop across said pilot conductor.

2. The combination with a resistance element of means for causing a slowly varying direct current to flow therethrough, a first condenser having a first of its terminals in common with a first terminal of said resistance element, a second condenser, and means for connecting said second condenser across said resistance element and across said first condenser alternately at such a rate that said current varies but little between successive ones of said connections so that the second terminal of said first condenser is thereby given a potential which is substantially as much lower than that of said common terminal as the potential of the second terminal of said resistance element is higher than that of said common terminal.

3. A combination in accordance with claim 2 in which the capacitances of said first and second condensers are substantially equal.

4. Apparatus for controlling the current supplied from a direct current source to a load to thereby control the load voltage comprising a space current device having its space current path connected in series with the load with respect to said source and having a control means for controlling the resistance of said space current path, a current path connected across said load comprising resistance means the resistance of which may vary, a first voltage component being set up across said resistance means in response to the current flowing therethrough, means for setting up a second voltage component equal to the difference of the load voltage and said first voltage component, and means responsive to the difference of said first and second voltage components for controlling said control means.

5. In combination, a source of direct current, a circuit supplied with current from said source, said circuit comprising in series a resistance element and a portion the resistance of which may vary, a space current device having an anode, a cathode and a space current control electrode, a condenser, a circuit connecting said control electrode and said cathode comprising said circuit portion and said condenser in series, means for variably charging said condenser under control of the variable voltage across said resistance element so that the polarity of the voltage across said condenser is opposed in said control electrode-cathode circuit to that of the voltage across said circuit portion, and means under control of said space current device for causing the voltage of said current source to vary in response to voltage variations in said control electrode-cathode circuit.

6. In combination, a first circuit comprising in series a resistance element and a resistive portion the resistance of which may vary, a direct current source, means for supplying current from said source to said first circuit to cause to be set up a first voltage across said resistance element and a second voltage across said resistive portion, a space current device having an anode, a cathode and a control electrode, a condenser, means for charging said condenser to a third voltage substantially equal to said first voltage, a second circuit connecting the cathode and control electrode of said space current device, means comprising said space current device for controlling the current supplied from said source to said first circuit in response to a voltage impressed upon said second circuit, and means for impressing upon said second circuit a voltage equal to the difference of said second and third voltages.

7. In combination, a space current device having an anode, a cathode and a control electrode, a space current circuit connecting said anode and said cathode, a source of space current in said space current circuit, a condenser, a resistor, resistance means the resistance of which may vary, means for supplying current through said resistor and said resistance means in series, means for charging said condenser to a voltage substantially equal to the voltage drop across said resistor, and a circuit comprising said condenser and said resistance means in series connecting said control electrode and said cathode for impressing upon said control electrode with respect to said cathode a potential for controlling the current in said space current circuit.

8. A combination in accordance with claim 7 in which said means for charging said condenser comprises a second condenser and switching means for repeatedly connecting said second condenser across said resistor during intermittent periods and for connecting said second condenser across said first condenser during intervals separating said periods.

9. In combination, a space current device having an anode, a cathode and a control electrode, a space current circuit connecting said anode and said cathode, a source of space current in said space current circuit, a control electrode-cathode circuit connecting said control electrode and said cathode, a resistor, resistance means the resistance of which may vary, a current path comprising said resistor and said resistance means in series, means for supplying current to said current path, means for deriving from said current path an electromotive force substantially equal to the difference of the electromotive forces across said resistance means and said resistor, respectively, and means for impressing said derived electromotive force upon said control electrode-cathode circuit for controlling the current in said space current circuit.

HARRY W. NYLUND.

REFERENCES CITED

The following references are of record in the file of this patent:

UNITED STATES PATENTS

| Number | Name | Date |
|---|---|---|
| 1,849,141 | Dutton | Mar. 15, 1932 |
| 1,959,298 | Levy | May 15, 1934 |
| 2,057,520 | Gulliksen | Oct. 13, 1936 |
| 2,098,968 | Mallinckrodt | Nov. 16, 1937 |
| 2,116,600 | Fisher et al. | May 10, 1938 |
| 2,179,915 | Blair | Nov. 14, 1939 |
| 2,188,671 | Wilson | Jan. 30, 1940 |
| 2,383,333 | Milward | Aug. 21, 1945 |